United States Patent Office 3,397,354
Patented Aug. 13, 1968

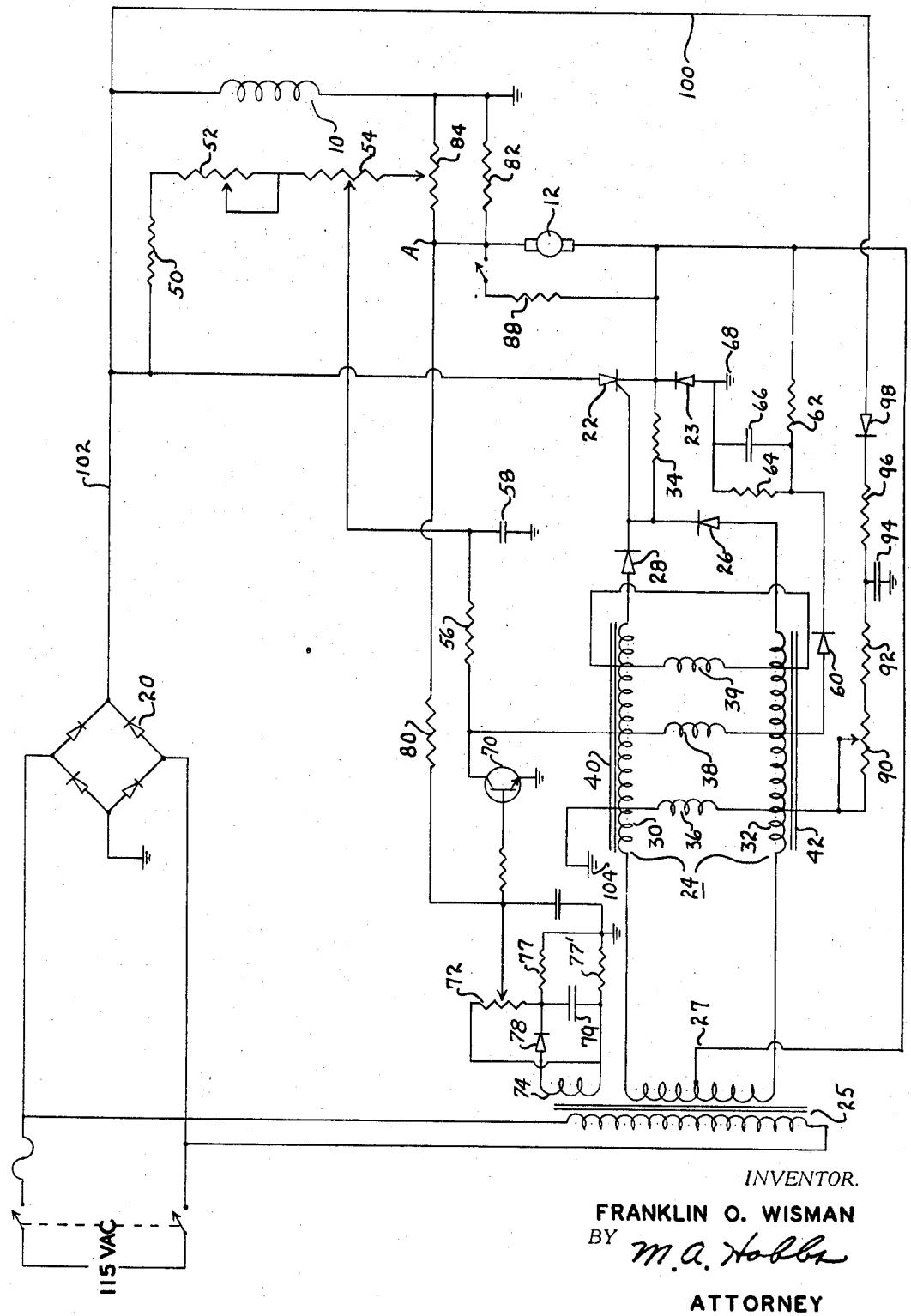
INVENTOR.
FRANKLIN O. WISMAN
BY M.A. Hobbs
ATTORNEY

3,397,354
MAGNETIC AMPLIFIER CONTROL SYSTEM
WITH RESET CIRCUIT
Franklin O. Wisman, South Bend, Ind., assignor to The Reliance Electric and Engineering Company, a corporation of Ohio
Filed Sept. 29, 1965, Ser. No. 491,341
9 Claims. (Cl. 323—22)

ABSTRACT OF THE DISCLOSURE

A motor control system having a silicon controlled rectifier and a magnetic amplifier, in which a circuitry is used to reset the magnetic amplifier to its original operating state so that the control will not cause an excessive initial load on the motor or driven equipment when the control is reenergized. The reset circuitry includes a winding in the magnetic amplifier in addition to the control winding for performing the resetting operation.

---

In the application of magnetic amplifier control systems it frequently occurs that shutdown of the system leaves the magnetic elements in a residual state which will produce a transiently abnormal response when the system is re-energized. This is particularly true of closed loop motor controls where a feed-back voltage derived from motor speed serves to de-saturate a magnetic amplifier control element that is being driven toward saturation by a reference signal. Ordinarily, the reference signal will be influenced by a ramp capacitor used to insure progressive timed start-up and even in the absence of such a starting ramp capacitor, it is customary to include a damping circuit in the magnetic amplifier to preclude abrupt changes in the condition of saturation and operating output condition. Therefore, frequently, when the system is shut down by interrupting the power supply line, the magnetic cores will be driven to and left in a state of saturation representing a high output, as a result of the slow decay of control signal. When the power is reapplied, the motor will experience a heavy current inrush and lurch forward even though the speed control is set for zero speed. This inrush of current frequenlty is of a magnitude sufficient to blow fuses or in some instances to damage control system components.

It is therefore an important object of this invention to provide a magnetic amplifier arrangement which will eliminate or minimize the foregoing difficulties and leave the magnetic cores of the amplifier in a condition corresponding to essentially zero output after shutdown, and in which this condition will remain indefinitely, insuring against spurious inrush transients on restarting.

Another object of the invention is to provide a circuit in combination with magnetic amplifiers of a motor control system, which will prebias the magnetic cores of the amplifier to optimum re-start condition automatically after the motor has been shut off under heavy load conditions, and which is preconditioned during operation of the system to perform the prebiasing function substantially instantaneously following motor shutdown.

Still another object of the invention is to provide a relatively simple circuit of the aforesaid type in a magnetic amplifier of a motor control system, which can readily be incorporated in the conventional magnetic amplifier without changing the characteristics of the amplifier for normal running operation and control of the motor and which does not interfere with the starting of the motor under normal conditions following motor shutdown under no load or light load conditions.

A further object is to provide a circuit in combination with a magnetic amplifier which can be incorporated therein without any substantial changes being required in the basic control system, and which operate to protect semi-conductors used in combination with such magnetic amplifiers from the destructive effects of power line voltage spikes or surges.

Additional objects and advantages of the invention will become apparent from the following description and accompanying drawing, wherein the figure is a schematic representation of an electronic motor control device embodying the present invention.

Referring to the drawing, the motor to be controlled consists of two parts, the field winding 10, and the armature 12. The direct current necessary to operate the motor is derived from rectifier bridge 20. Field winding 10 is connected directly between bridge 20 and ground and is thus always operated at the same potential. Armature 12, however, receives its operating voltage through silicon controlled rectifier 22, part of the voltage regulator circuit composed of silicon controlled rectifier 22 and diode 23, and the voltage and current flowing into armature 12 are regulated by said silicon controlled rectifier (hereinafter referred to as SCR) 22. The SCR, in turn, is controlled by a magnetic amplifier 24, through diodes 26 and 28, load current windings 30 and 32 of the magnetic amplifier acting upon resistor 34 as their common load, with the gate of SCR 22 sensing variations in voltage across said load. Power for the operation of the magnetic amplifier 24 is taken from transformer 25, the center tap 27 of which is connected to the side of the load resistor 34 opposite rectifiers 26 and 28 in a standard configuration requiring no further explanation. Bias winding 36 and control winding 38 of magnetic amplifier 24, by varying the amount of saturation of the cores of the magnetic amplifier, regulate the impedance of load windings 30 and 32, thus regulating the current and voltage flowing through the load windings, and the current flowing to the resistor 34 and SCR 22. The method of control for bias and control windings 36 and 38, respectively, will be described in detail hereinafter. Damper winding 39 serves to smooth out the response of the magnetic amplifier, and being of a standard configuration, will not be described in detail herein.

Control winding 38 is the primary speed control. An increase in the current through this winding results in an increase in the saturation of the cores 40 and 42 of magnetic amplifier 24, causing a decrease in the impedance of load windings 30 and 32, and a subsequent increase in the speed of the motor. The voltage to winding 38 is derived from rectifier bridge circuit 20, through voltage divider resistor 50, potentiometers 52 and 54, and fixed resistor 56. Storage capacitor 58 serves to produce a progressive timed starting ramp. On energization, it will be charged from bridge 20 through resistances 52 and 54 in the well known exponential manner. It also serves to reduce ripple compoents of current in control winding 38. After passing through control winding 38, the current passes through blocking diode 60 and the voltage divider circuit, comprising resistors 62 and 64 and storage capcitor 66 and thence to ground 68.

The current through control winding 38, and therefore the speed of the motor, is variably controlled by rheostat 52, which limits the maximum speed of the motor, and by potentiometer 54, which varies the speed of the motor to satisfy requirements.

By providing a secondary ground return for the positive EMF coming off resistor 56, the circuit comprising transistor 70 and its associated biasing circuitry, described in more detail hereinafter, acts as a current limiter, in effect countering the direct action of the speed control 54 in accordance with the bias on the base of transistor 70. The effect of this circuit is to by-pass current applied to winding 38 when the motor armature current exceeds a pre-established value. This is accomplished by applying a current through resistance 80 to the base of transistor 70. This current is poled in a direction to induce conduction of transistor 70 and the current being derived from resistor combinations 82 and 84 carrying motor armature current is proportional thereto. The base of transistor 70 is also being supplied with a determinate value of reference current through potentiometer 72, dividers 77 and 77' from capacitor 79, diode 78 and transformer winding 74. This reference current is poled to hold the transistor non-conducting, opposing the effect of the current being supplied through resistor 80. Transistor conduction occurs when the current through 80, proportional to armature current, overcomes the oppositely poled reference. Transistor conduction has the effect of diverting or by-passing the current through control winding 38 which would otherwise produce greater armature currents.

Potentiometer 84 provides an adjustable means for keeping the motor speed constant under varying loads by sensing changes in voltage across current limiting resistor 82 and IR compensation potentiometer 84. As the load on the motor increases, the current it draws tends to increase, and this, in turn, causes the voltage appearing at point A to increase as: $E=IR$ where E is the voltage drop across the resistor;
I is the current being drawn through the resistor;
and R is the resistance, in this case, the resistance comprising the parallel resistance of current limiting resistor 82 and IR compensation potentiometer 84, and being at any given instant of a constant resistance, may be treated as a constant K. By substituting in the formula, $E=IK$ is obtained, and it is seen that the voltage drop across the resistors 82 and 84 is directly proportional to the current drawn through them. Thus, as the load on the motor increases, with its subsequent increase in current drawn, the voltage developed across resistor 82 increases proportionately. Potentiometer 84 allows an adjustable fraction of that voltage to be inserted in series with speed selector potentiometer 54, in effect, adjusting the speed input signal upward, and increasing the voltage applied to control winding 38. This has the effect of increasing the time of current conduction through load current windings 30 and 32 of magnetic amplifier 24, and causing SCR 22 to pass more current to the armature to satisfy the demands of the increased load. Conversely, a decreased load, with the subsequent tendency of the motor to increase its speed, is counteracted by a decrease in the current through the motor armature.

The IR compensation potentiometer 84 compensates for error introduced by the voltage drop across the internal resistance of the armature 12. Its effect is reflected back on speed control potentiometer 54, resulting in correction for the heretofore mentioned internal resistance of said armature.

Resistor 88 is a dynamic braking resistor which is operative in the circuit only when power has been removed from the armature and the motor is slowing down. It serves as a circuit for draining off the current produced by the armature as it slows down, and allows for quicker and smoother braking of the motor.

The foregoing description has been primarily concerned with the circuit while it is energized. Referring now to the condition which prevails when power is removed from the circuit, storage capacitor 58 is left charged, but has lost its charging potential and therefore begins to discharge slowly just as it provided the time ramp start on energization. When the power is removed, it may discharge through speed control 54 and IR compensation potentiometer 84 and thus to ground, and it may discharge through control winding 38 and its associated circuitry, and, in actual practice, it discharges through both paths simultaneously. The former path has no detrimental effect, but the latter does, as will be more fully explained hereinafter.

Assume for a moment that the cores of magnetic amplifier 24 are saturated when the circuit is energized. The load coils 30 and 32 would then have a low impedance, and when the circuit was energized, current would surge through the magnetic amplifier causing a concomitant surge of current through the armature 12 of the motor. This surge of current would cause the motor to lurch when it was first turned on, and the magnitude of the current could be sufficient to damage the semi-conductor components. In any case, the sudden lurch is undesirable in that it may cause damage to the machinery to which the motor is attached or could be hazardous to personnel. Thus, it is seen that it is undesirable to have the cores of the magnetic amplifier saturated when the circuit is first energized; however, in the control system thus far described, when the circuit is de-energized, the current flowing from storage capacitor 58 through control winding 38 is sufficient to bring the cores of the magnetic amplifier close to saturation. In order to overcome this adverse condition, a pre-biased circuit is included, consisting of bias winding 36 of magnetic amplifier 24, bias control potentiometer 90, divider resistor 92, storage capacitor 94, surge resistor 96 and isolating diode 98. It derives its operating power from rectifier bridge 20 through leads 100 and 102 connecting diode 98 with the bridge. While the entire motor speed control circuit is energized, the power from rectifier bridge 20 flows through isolation diode 98 to surge resistor 96, the purpose of which is to protect diode 98 from too large a flow of current into capacitor 94 while it is initially charging. The power flows from the surge resistor 96 through maximum bias limiter resistor 92, through bias control potentiometer 90 and through bias winding 36 to ground 104. The polarity of the bias winding is such that its magnetic field directly opposes that of control winding 38; thus, the two fields would cancel each other if one were not greater than the other. However, the amplitude of the magnetic field of control winding 38 is sufficient to overcome the opposing effect of bias winding 36 under running conditions. When the circuit is de-energized, storage capacitor 94, being blocked by diode 98 from discharging elsewhere, can only discharge through bias winding 36. Therefore, more current flows through bias winding 36 than through control winding 38 after shutdown, and consequently, the adverse effect of the current flowing through control winding 38 is counteracted. The size of capacitor 94 is sufficient that the length of time that a discharge controlled by the time constant of the RC circuit consisting of capacitor 94, and resistors 90 and 92, far exceeds the discharge time of capacitor 58, its rate of discharge primarily being controlled by the time constant of the circuit consisting of capacitor 58, and potentiometers 54 and 84. Therefore, capacitor 94 is effective in the circuit after shutdown sufficiently long not only to simply counteract the adverse effect of the discharge of capacitor 58, but to bring the saturation point of the cores 40 and 42 from their previous loaded operating point back to the safe saturation point necessary for starting the motor without producing the surge of current to the armature, with the associated lurch of the shaft which is so undesirable.

If capacitor 58 were removed from the circuit, the problem would still be present, in that the magnetic amplifier and all of its windings, being inductors (indicators are inherently storage devices), would have the same adverse effect as the capacitor. Further, if the capacitor were removed from the circuit, the circuit would be less stable while in operation and lack the advantages of the smooth starting ramp, and hence it is necessary in the circuit for optimum performance of the control system. As explained herein, the adverse effect of the condition created by capacitor 58 during the starting operation is eliminated by the present pre-biased circuit, without adversely affecting the normal operation of the control system.

A further advantage is the surge protection afforded by the pre-biased circuit, this function being performed primarily by capacitor 94 and resistor 96. In this circuit, capacitor 94 has a low level of dynamic impedance to the incoming surge and the effective circuit impedance is established by resistor 96 which is selected to limit the starting inrush current to a value which may safely be tolerated by diode 98. The surge protection is obtained inherently by the pre-biased circuit illustrated in the drawing.

While only one embodiment of the circuitry has been described in detail herein, various changes and modifications may be made without departing from the scope of the invention.

I claim:

1. In a motor control system: a silicon controlled rectifier having a gate, a source of DC current for said rectifier, a magnetic amplifier having a load winding connected to said gate, a damper winding, a control winding for said load winding, a circuit for said control winding connected to said source of DC current and having a speed control potentiometer and a storage capacitor therein, a bias winding, a circuit for said bias winding having a lead connected to said DC current source and including, in series, a bias control potentiometer, a divider resistor, a capacitor connected thereto for maintaining current in said bias winding after de-energization of said control winding, a surge resistor and an isolation diode in said circuit between said capacitor and the source of DC current for reserving the energy stored in said capacitor exclusively for energization of the bias winding, whereby said magnetic amplifier is left in a biased condition on de-energization of the system, and a transformer for supplying current to said load winding.

2. In a motor control system: a silicon controlled rectifier having a gate, a source of DC current for said rectifier, a magnetic amplifier having a load winding connected to said gate, a control winding for said load winding, a circuit for said control winding connected to said source of DC current and having a speed control potentiometer and a storage capacitor therein, a bias winding, a circuit for said bias winding having a lead connected to said DC current source and including, in series, a capacitor connected thereto for maintaining current in said bias winding after de-energization of said control winding, and an isolation diode in said circuit between said capacitor and the source of DC current for reserving the energy stored in said capacitor for energization of the bias winding, whereby said magnetic amplifier is left in a biased condition on de-energization of the system.

3. In a motor control system: a silicon controlled rectifier having a gate, a source of DC current for said rectifier, a magnetic amplifier having a load winding connected to said gate, a control winding for said load winding, a circuit for said control winding having a storage capacitor therein, a bias winding, a circuit for said bias winding having a lead connected to said DC current source and including, in series, a capacitor connected thereto for maintaining current in said bias winding after de-energization of said control winding, and an isolation means in said circuit between said capacitor and the source of DC current for reserving the energy stored in said capacitor for energization of the bias winding, whereby said magnetic amplifier is left in a biased condition on de-energization of the system.

4. In a motor control system: a magnetic amplifier having a load winding, a control winding for said load winding, and a bias winding, a circuit for said bias winding having a lead connected to a source of DC current and including, in series, a bias control rheostat, a capacitor connected thereto for maintaining current in said bias winding after de-energization of said control winding, a surge resistor, and a diode in said circuit between said capacitor and the source of DC current for reserving the energy stored in said capacitor for energization of the bias winding, whereby said magnetic amplifier is left in a biased condition on de-energization of the system.

5. In a motor control system: a magnetic amplifier having a load winding, a control winding for said load winding, and a bias winding, a circuit for said bias winding having a lead connected to a source of DC current and including, in series, a capacitor connected thereto for maintaining current in said bias winding after de-energization of said control winding, and an isolation means in said circuit between said capacitor and the source of DC current for reserving the energy stored in said capacitor for energization of the bias winding, whereby said magnetic amplifier is left in a biased condition on de-energization of the system.

6. In a magnetic amplifier having a load winding, a control winding for said load winding and a bias winding: a circuit for said bias winding having a lead connected to a source of DC current and including, in series, a bias control potentiometer, a capacitor connected thereto for maintaining current in said bias winding after de-energization of said control winding, a surge resistor, and an isolation diode means in said circuit between said capacitor and the source of DC current for reserving the energy stored in said capacitor for energization of the bias winding, whereby said magnetic amplifier is left in a biased condition on de-energization of the system.

7. In a magnetic amplifier for use with a silicon controlled rectifier having a gate, a load winding connected to said gate, a control winding for said load winding and a bias winding: a circuit for said bias winding having a lead connected to a source of DC current and including, in series, a capacitor connected thereto for maintaining current in said bias winding after de-energization of said control winding, and an isolation diode in said circuit between said capacitor and the source of DC current for reserving the energy stored in said capacitor for energization of the bias winding, whereby said magnetic amplifier is left in a biased condition on de-energization of the system.

8. In a magnetic amplifier having a load winding, a control winding for said load winding and a bias winding: a circuit for said bias winding having a lead connected to a source of DC current and including, in series, a capacitor connected thereto for maintaining current in said bias winding after de-energization of said control winding, and an isolation means in said circuit between said capacitor and the source of DC current for reserving the energy stored in said capacitor for energization of the bias winding.

9. In a magnetic amplifier, a load winding, a control winding for said load winding and a bias winding: a circuit for said bias winding having a lead connected to a source of DC current and including, in series, a capacitor connected thereto for maintaining current in said bias winding after de-energization of said control winding, and an isolation diode in said circuit between said capacitor and the source of DC current for reserving the energy stored in said capacitor for energization of the bias winding, whereby said magnetic amplifier is left in a biased condition on de-energization of the system.

References Cited

UNITED STATES PATENTS 2,985,815  5/1961  Beeber.
3,207,975  9/1965  Pintell.
3,222,585  12/1965  Lobb _____ 323—89 X LEE T. HIX, *Primary Examiner.*

A. D. PELLINEN, *Assistant Examiner.*